R. W. McCLELLAND.
Wagon Hub.
No. 56,586.
Patented July 24, 1866.
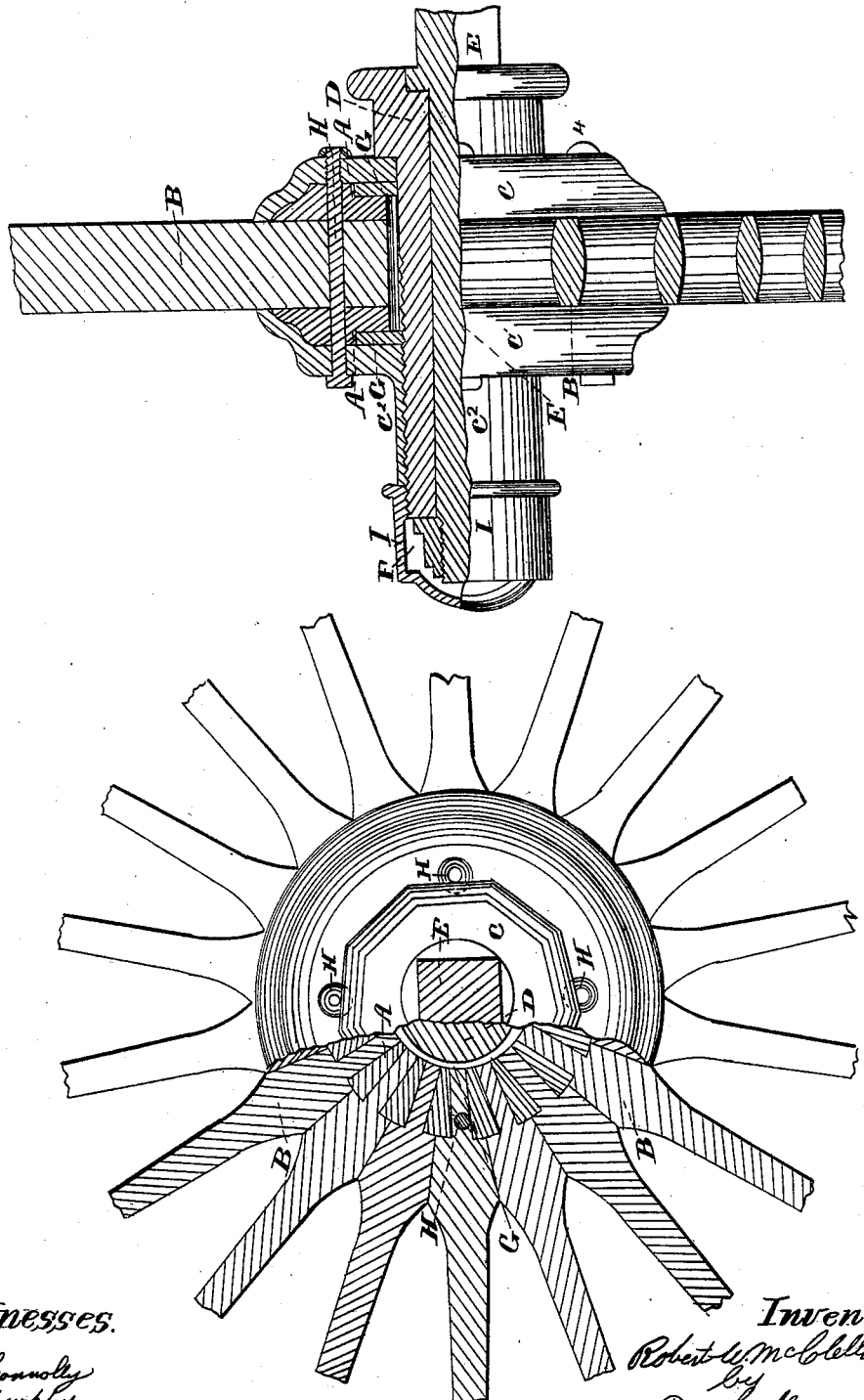
Witnesses.
Inventor.

UNITED STATES PATENT OFFICE.

ROBERT W. McCLELLAND, OF SPRINGFIELD, ILLINOIS.

IMPROVEMENT IN WAGON-HUBS.

Specification forming part of Letters Patent No. 56,586, dated July 24, 1866.

*To all whom it may concern:*

Be it known that I, ROBERT W. MCCLELLAND, of Springfield, in the county of Sangamon and State of Illinois, have invented a new and useful Improvement in Hubs for Vehicles; and I do hereby declare that the following is a full, clear, and exact description of the same, reference being had to the annexed drawings, made part of this specification.

Figure 1 is a side elevation, and Fig. 2 is a front elevation.

In both the figures parts are represented as broken away to show the internal structure, and the same letters represent identical parts.

A is a wooden hub, formed with mortises to receive the tenons cut upon the ends of the spokes B. A brass cap, G, is fitted to the outside of the hub, and over these pass the disks of cast-iron C and C', on either side, completely covering the hub and fitting snugly against the spokes. These disks C and C' are joined by bolts H, passing through from side to side, having a head upon one end and a screw and nut upon the other. An opening is left through the center large enough to receive the pipe-boxing D, which passes through from inside to outside of the wheel.

On the outside of the wheel is the disk C', which has a projecting cylindrical flange, C², on the inside of which is cut the thread of a screw formed to receive a corresponding thread upon the outer surface of the pipe-boxing D. This pipe projects beyond the flange C² far enough to receive upon the same thread the cap I.

The pipe-boxing is formed with recesses on its inner face to hold the oil used in lubricating the spindle E, which passes through the pipe, and has a nut, F, on its outer end to secure the hub on the spindle.

The pipe has a shoulder at its inner end resting upon the inner disk, C, while the screw upon its outer end draws firmly against the disk C', thus, in unison with the bolts H, preserving perfectly the rigidity of the hub.

Having fully explained the mode of constructing my improved hub, what I claim as my invention, and seek to secure by Letters Patent, is—

1. Constructing the hubs of vehicles of wood for receiving the tenons of the spokes, and incasing the same by metallic disks, substantially in the manner and for the purpose set forth.

2. In combination with the disks C and C', the pipe-boxing D, arranged substantially as and for the purpose set forth.

3. In combination with the spindle E, flange C², and pipe-boxing D, the cap I, substantially as set forth.

4. In combination with the wooden hub A and metallic disks C and C', the bolts H, or their equivalents, substantially as and for the purpose set forth.

In testimony whereof I have signed my name to this specification in the presence of two subscribing witnesses.

ROBERT W. McCLELLAND.

Witnesses:
PATT CARMODY,
GEO. HAMLIN.